United States Patent
Fritz et al.

(10) Patent No.: US 12,181,030 B2
(45) Date of Patent: *Dec. 31, 2024

(54) POWER SPLIT TRANSMISSION STRUCTURE

(71) Applicant: Deere & Company, Moline, IL (US)

(72) Inventors: Norbert Fritz, Ilvesheim (DE); Rainer Gugel, Plankstadt (DE); David Mueller, Dettenheim (DE)

(73) Assignee: DEERE & COMPANY, Moline, IL (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/726,245

(22) Filed: Apr. 21, 2022

(65) Prior Publication Data

US 2022/0243794 A1    Aug. 4, 2022

Related U.S. Application Data

(62) Division of application No. 16/565,108, filed on Sep. 9, 2019, now Pat. No. 11,365,792.

(30) Foreign Application Priority Data

Sep. 14, 2018  (DE) .......................... 102018215684.0

(51) Int. Cl.
*B60K 25/00* (2006.01)
*B60K 25/06* (2006.01)
(Continued)

(52) U.S. Cl.
CPC .......... *F16H 37/042* (2013.01); *B60K 25/06* (2013.01); *F16H 61/664* (2013.01); *F16H 63/08* (2013.01);
(Continued)

(58) Field of Classification Search
CPC .................. F16H 3/728; F16H 37/042; F16H 2061/0012; B60K 17/28; B60K 25/06
See application file for complete search history.

(56) References Cited

U.S. PATENT DOCUMENTS 5,669,842 A    9/1997  Schmidt
2011/0042155 A1  2/2011  Tarasinski et al.
(Continued)

FOREIGN PATENT DOCUMENTS

DE    19749074 A1    5/1999
DE    69702806 T2    12/2000
(Continued)

OTHER PUBLICATIONS

European Search Report issued in counterpart European Patent Application No. 19196874.2 dated Feb. 20, 2020 (41 pages).

*Primary Examiner* — William C Joyce
(74) *Attorney, Agent, or Firm* — KLINTWORTH & ROZENBLAT IP LLP

(57) ABSTRACT

A method controls a power split transmission structure to direct drive power from a drive through at least three interfaces to at least one output to supply connected consumers. The transmission structure has at least two variator paths each comprising a summation gearbox downstream of the interfaces in which drive power is varied via a mechanical and an electrical path. The transmission structure has power electronics or a hydraulic control device including at least three electric or hydraulic machines arranged in parallel with the summation gearbox of each variator path downstream of the interfaces. The method simultaneously controls the power electronics or a hydraulic control device and the electric or hydraulic machines in such a way that fluctuations in the power supply to the consumers are compensated for by the electric or hydraulic machines by regulating, via a control device, the summation gearbox of (Continued)

each of the variator paths and modifying a torque, a speed, or both, of the drive power via the power electronics system or the hydraulic control device.

16 Claims, 2 Drawing Sheets

(51) Int. Cl.
    *F16H 37/04* (2006.01)
    *F16H 61/664* (2006.01)
    *F16H 63/08* (2006.01)
    *B60K 17/28* (2006.01)
    *F16H 61/00* (2006.01)

(52) U.S. Cl.
    CPC ........ *B60K 17/28* (2013.01); *B60K 2025/065* (2013.01); *F16H 2037/048* (2013.01); *F16H 2061/0012* (2013.01); *F16H 2200/2007* (2013.01); *F16H 2702/02* (2013.01)

(56) References Cited

U.S. PATENT DOCUMENTS

| | | |
|---|---|---|
| 2011/0178660 A1 | 7/2011 | Tarasinski et al. |
| 2013/0068068 A1 | 3/2013 | Witt |
| 2016/0091063 A1 | 3/2016 | Rekow et al. |
| 2017/0299021 A1 | 10/2017 | Reick et al. |
| 2020/0088279 A1 | 3/2020 | Fritz et al. |

FOREIGN PATENT DOCUMENTS

| | | |
|---|---|---|
| DE | 102012204477 A1 | 9/2013 |
| DE | 202014000679 U1 | 2/2014 |
| DE | 102013224383 | 5/2015 |
| DE | 102014221914 | 5/2015 |
| DE | 102014221916 | 5/2015 |
| DE | 102016206205 A1 | 10/2017 |
| DE | 102016221343 A1 | 5/2018 |

POWER SPLIT TRANSMISSION STRUCTURE

CROSS-REFERENCE TO RELATED APPLICATION(S)

This application is a divisional of U.S. patent application Ser. No. 16/565,108, filed Sep. 9, 2019, now allowed, which claims priority to German application No. DE 102018215684, filed Sep. 14, 2018, which is incorporated herein in its entirety.

STATEMENT OF FEDERALLY SPONSORED RESEARCH OR DEVELOPMENT

Not applicable.

FIELD OF THE DISCLOSURE

The disclosure relates to a power split transmission structure to direct driving power from a drive to at least one output supplying connected consumers.

BACKGROUND OF THE DISCLOSURE

Continuously variable power split transmission units are to be found in construction machines and agricultural work machines, for example tractors, according to the current prior art in particular frequently in the premium sector, and are realized as hydraulically/mechanically power split transmissions. The power flow is split, in this connection, into a mechanical path, which is run steadily via one or multiple planetary gear sets, and into a hydrostatic path, in which the power is run via a hydrostatic variator, by way of which continuously variable adjustment of the gear ratio is able to be performed.

DE 19749074C2 and DE 102012204477A1 disclose continuously variable power split transmission units where the variable path is realized in each case as an electric variator. In the case of such electromechanical transmissions, both mechanical and electric power is utilized as driving power.

A different direction of development in the case of construction machines and agricultural work vehicles consists in the design of a second on-board electrical system, which is in addition to the existing on-board electrical system of the machine and is operated at a higher nominal voltage, by way of which electric consumers, which require such a higher nominal voltage for their operation, are able to be driven. The electric consumers can be arranged both on the machine per se and on an attachment device. The additional second on-board electrical system is conventionally generated on the machine by its own generator system which is provided for this purpose. However, additional product costs arise in this connection and the overall degree of efficiency is reduced as a consequence of the additional components.

SUMMARY OF THE DISCLOSURE

In one aspect, the disclosure provides a method for controlling a power split transmission structure to direct drive power from a drive through at least three interfaces to at least one output to supply connected consumers. The transmission structure has at least two variator paths each comprising a summation gearbox downstream of the interfaces in which drive power is varied via a mechanical and an electrical path. The transmission structure has power electronics or a hydraulic control device including at least three electric or hydraulic machines arranged in parallel with the summation gearbox of each variator path downstream of the interfaces. The method simultaneously controls the power electronics or a hydraulic control device and the electric or hydraulic machines in such a way that fluctuations in the power supply to the consumers are compensated for by the electric or hydraulic machines by regulating, via a control device, the summation gearbox of each of the variator paths and modifying a torque, a speed, or both, of the drive power via the power electronics system or the hydraulic control device.

The details of one or more example embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
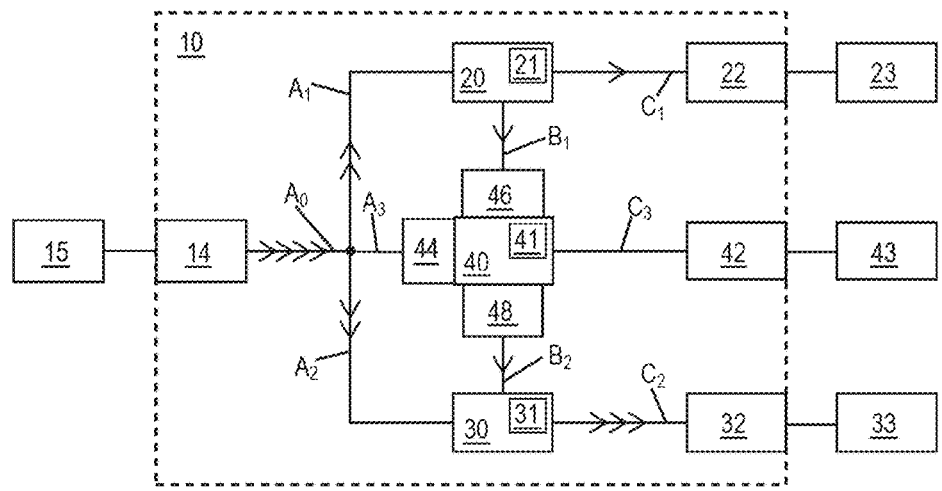
FIG. 1 shows an example of the transmission structure with a first example of a power flow.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

This disclosure may provide a transmission structure which enables improved efficiency, multiple outputs of the transmission system having to be supplied at the same time. The transmission structure may have at least three interfaces in the form of inputs or outputs in order to direct driving power from a drive to at least one output in order to supply connected consumers. In this case, the transmission structure comprises an electric or hydraulic machine for converting the driving power and at least two variator paths, which each comprise a mechanical and an electric path, in order to modify torque and/or the speed, wherein the variator paths each comprise an electric or hydraulic machine and a summation gearbox, for summation of the power from a mechanical path and from a non-mechanical path. In addition, the transmission structure comprises a control device for regulating the summation gearbox, wherein the transmission structure additionally comprises a power electronics system/hydraulic control device which is connected to the electric or hydraulic machines. The transmission structure directs the driving power via the variator paths such that the electric/hydraulic machines are able to be actuated in generator or motor mode in order to compensate for a power shortfall or a power oversupply at at least one outlet of the transmission structure.

As a result of the arrangement of the transmission structure and the use of at least two variators, the overall efficiency is able to be increased. The driving power, which is mostly made available by an internal combustion engine, is converted into electric or hydraulic power in a first electric/hydraulic machine and made available to the power electronics system which distributes it to the variator paths according to the requirements thereof or is even able to re-convert it into mechanical driving energy. The transmission structure enables very prompt adaptation of the performance characteristics of the vehicle so that it is possible to react immediately to modified driving conditions. This makes it possible to avoid a shortage in driving power or electric/hydraulic power for instance in the case of towed work devices.

In a further embodiment, the transmission structure can comprise one or multiple additional transmissions with a variable gear ratio in at least one variator path.

The transmission structure, in this connection, can be provided with any number of further variators, it also being possible, as a result, for further inputs and/or outputs of the transmission structure to be provided. As the requirements concerning agricultural work machines always increase, the transmission structure, in this connection, is able to be adapted flexibly to modified conditions.

In the case of a further development, the power electronics system can have an external supply connection, the supply connection being able to consume and/or output power.

The transmission structure can consequently comprise an electric connection which is supplied as needed by the power electronics system and serves for the purpose of supplying a connected device, for example a device trailed by the work machine, with electric power. The electric power which is needed by a trailed device can be subject to temporal fluctuations, for instance as a result of different ground conditions, inclines or work requirements. Depending on the implementation of the device, recovery of electric power can also be provided, for example in the case of a braking operation. The fluctuations are able to be intercepted or eliminated by the transmission structure by electric power being directed to the output or being converted coming from the output and/or being directed to other consumers inside the transmission structure as a result of using and actuating the electric/hydraulic machines together with the power electronics system.

In one example implementation, the transmission structure can comprise an output which is operatively connected to a power take off shaft such that power is able to be output to the power take off shaft or consumed by the power take off shaft.

The power take off shaft is subject to temporal fluctuations in the power requirement. This can occur as a result of the lie of the land, the speed of the vehicle or of the work machine and as a result of the changing ground conditions. The power fluctuations can be compensated for or intercepted by the transmission structure. Smoother working and uniform power requirement of the drive is made possible. Power is able to be directed into the transmission structure and from there run to further outputs by the power consumption from the power take off shaft.

In the case of a further example, an output of the transmission structure can be operatively connected to a travel drive such that power is able to be output to the travel drive or consumed by the transmission structure.

The travel drive, which serves for the purpose of driving the work machine, can be connected or provided at an output of the transmission structure. The supplying of the travel drive with driving power can be controlled by the transmission structure, a power shortage at the travel drive being able to be eliminated and/or to be avoided entirely as a result even where the speed remains constant or the drive motor is powered by the additional introduction of driving power by the electric/hydraulic machines. In addition, driving power can be consumed by the transmission structure, for example when braking, and can be converted into electric/hydraulic energy by the electric/hydraulic machines, this being able to be used, in turn, for supplying a further output with power.

In another example implementation, the transmission structure can comprise an energy store which is used for compensating for a power shortfall or power oversupply.

In the case of a further development, an output of the transmission structure can be connected to a hydraulic pump or a fan.

A further aspect of the disclosure relates to a method for controlling a power split transmission structure in order to direct driving power from a drive to at least one output in order to supply connected consumers. The transmission structure comprises at least two variator paths in which driving power is varied via a mechanical and an electric path, wherein the transmission structure comprises a power electronics system, and the method actuates the power electronics system and the electric machines at the same time in such a manner that fluctuations in the power supply of the consumers are compensated for by the electric machines.

In the case of a further development, each variator path is able to be actuated individually in order to direct power from one output to a further output such that power is able to be split for each output.

In a further example, the transmission structure can consume power through at least one output and/or direct it to a further output or convert it into electric/hydraulic power.

The following describes various implementations of a transmission structure for directing power from a drive machine to one or more power consuming devices. The following examples are described in the context of a mechanical-electrical application in which power takes, and is converted between, mechanical and electrical forms. It should be understood that the transmission structure may also be implemented in mechanical-hydraulic applications in which power takes, and is converted between, mechanical and hydraulic forms. As such, reference below to operational power electronics and motor generator machines may be understood to contemplate hydraulic control systems/devices and hydraulic motors or other hydraulic machines.

A transmission structure 10 is supplied with primary power by a vehicle drive 15. FIG. 1 shows the power flow by way of arrow symbols. As an example, the number of arrows represents the power for the respective path in the transmission structure 10. The power paths, including or also referred to herein as "variator paths" having mechanical and non-mechanical paths, are shown by solid lines, on which, in turn, the arrows for the power are marked. Positions at which the power paths cross one another provide points of intersection. These can be implemented structurally by spur gear toothing or further usual structures. It should be noted that while single lines are shown in the figures to represent all of the power paths, the lines may each represent different power formats (e.g., mechanical or non-mechanical power) or include multiple power paths of the same or different (e.g., mechanical and non-mechanical) power formats. Moreover, the power paths may include power that flows (mechanically or non-mechanically) directly between components in which case such power is not represented in the figures by one or more designated lines.

In the illustrated example, power paths connect the drive 15 to summation gearboxes 20, 30 and to a motor generator, which converts electric power into mechanical power, or vice versa, during engine operation. The summation gearboxes 20, 30 may be regulated by one or more control devices, such as control devices 21, 31, respectively, which may be implemented in various ways, including electronically or hydraulically controlled hardware, such an electronic control device having one or more processors executing program code stored on memory components to control one or more actuators associated with the summation gearboxes 20, 30.

The illustrated transmission structure 10 comprises two summation gearboxes 20 and 30. Summation gearboxes can be realized, for example, as planetary gearing. Each interface of the planetary gearing is connected, in this case, to a branch of the power path. The upper summation gearbox 20 in FIG. 1 is connected to the drive 15, through an input 14 of the interface to which the drive 15 is coupled, via a power path $A_1$ and at the same time via a power path $A_2$ to the further summation gearbox 30. A second power path $B_1$ connects the summation gearbox 20 to a motor generator 46. A third power path $C_1$ connects the summation gearbox 20 to an output 22 which, in this example, can be the output for driving a connected consumer 23, such as a power take off shaft.

The second summation gearbox 30 is connected to the drive 15 through the input 15 and by way of a second power path $B_2$ to a motor generator 48 and by way of a third power path $C_2$ to an output 32 of the transmission structure 10 which can power a connected consumer 33 in the form of a travel drive.

In addition, a system of power electronics 40 is present which communicates with the motor generators 44, 46, 48 and is able to transfer and control electric power between the motor generators 44, 46, 48. The power electronics system 40 is additionally connected electrically via a power path $C_3$ to a further output 42 of the transmission structure 10 so that electric power is able to be output at that output to another connected consumer 43.

Four arrows in FIG. 1 show a mechanical power input on a power path $A_0$, which is made available by the drive 15. The power input is divided into the power path $A_1$ to the summation gearbox 20 and the power path $A_2$ to the summation gearbox 30 at the subsequent junction on the power path. At the summation gearbox 20, the control device using the power electronics system 40 splits off part of the power input, shown by an arrow symbol, and converts it into electric power in the motor generator 46. The electric power is directed on to the motor generator 48 by the power electronics system and there is once again converted into mechanical power and is run into the summation gearbox 30 via the power path $B_2$. In the summation gearbox 30, the additional power is added to the mechanical power, which is generated by the drive 15, and is output at the output 32 to the travel drive via power path $C_2$. The amount of power is shown symbolically by three arrow symbols. The transmission structure 10 can be used to cover short-term requirements of the travel drive so that there is no shortage of driving power.

Figure 2:
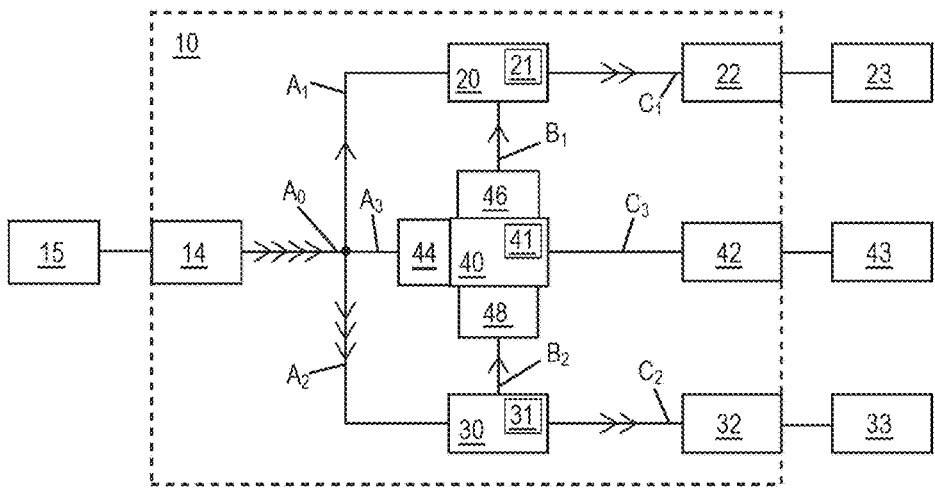
FIG. 2 shows another example of the transmission structure with a further example of a power flow.

FIG. 2 shows the transmission structure 10 with a further concept of the power supply. The power input by the drive 15 is split so that one part, shown by one arrow symbol, is directed to the summation gearbox 20 via power path $A_1$ and three parts are directed to the summation gearbox 30 via power path $A_2$. The summation gearbox 30 is actuated in such a manner that one part of the power is delivered via power path $B_2$ to motor generator 48 where it is converted into electric power and run to the motor generator 46. The remaining two parts are made available via power path $C_2$ to the output 32 for travel driving by the summation gearbox 30. The motor generator 46 converts the electric power into mechanical power again, this then being added via power path $B_1$ to the one power part in the summation gearbox 20. The resultant two power parts are supplied to the output 22 via power path $C_1$ for driving the power take off shaft. This shows how two outputs are able to be supplied with power by the transmission structure 10, a short-term diversion of the power being made possible.

Figure 3:
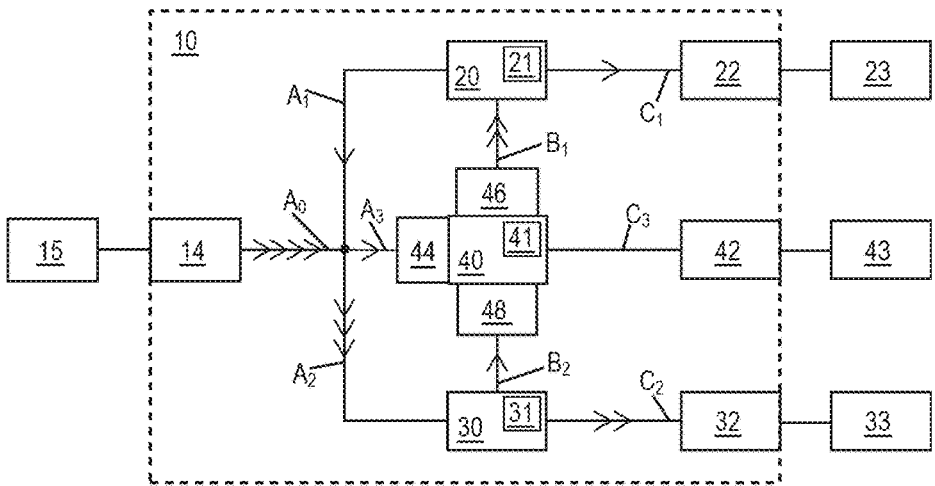
FIG. 3 shows another example of the transmission structure with a further example of a power flow.

FIG. 3 shows the symbolic four power parts coming from the drive 15 being split in such a manner that three parts are directed via power path $A_2$ to the summation gearbox 30 and one power part to the motor generator 44 via power path $A_3$. The motor generator 44 converts the mechanical power correspondingly into electric power, which is run to the motor generator 46 controlled by the power electronics system 40. In addition, one part of the mechanical power in the summation gearbox 30 is split off and directed to the motor generator 48 via power path $B_2$. There this is then also converted into electric power, this being directed together with the power part from the motor generator 44 together to the motor generator 46 and after conversion into mechanical power is run back via power path $B_1$, the summation gearbox 20 and power path $C_1$ to form a part at the output 22 for supplying the power take off shaft and to form a part at the summation gearbox 30 via power path $A_1$. In this connection, the power not required is able to be diverted for driving the power take off shaft so that further components are able to be supplied by the transmission structure 10.

Figure 4:
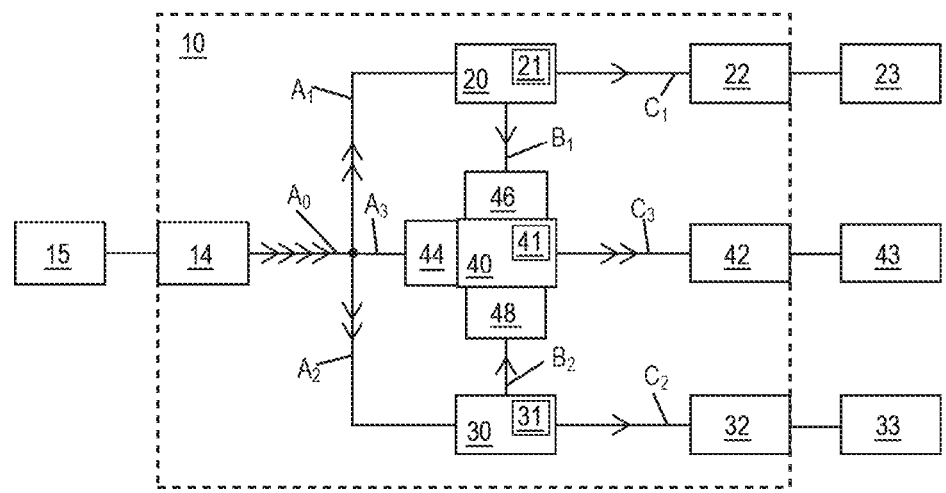
FIG. 4 shows another example of the transmission structure with a further example of a power flow.

FIG. 4 shows how, for example, all outputs 22, 32, 42 are able to be supplied with power at the same time. In this connection, the power is first of all split in such a manner that two parts are directed in each case to the summation gearboxes 20, 30 via power paths $A_1$ and $A_2$. The summation gearboxes 20, 30 run via power paths $B_1$ and $B_2$ one part in each case to the assigned motor generators 46, 48, which convert it into electric power. The power electronics system controls the summation of the power parts and supplies them to the output 42 via power path $C_3$ for an external electric power supply.

Figure 5:
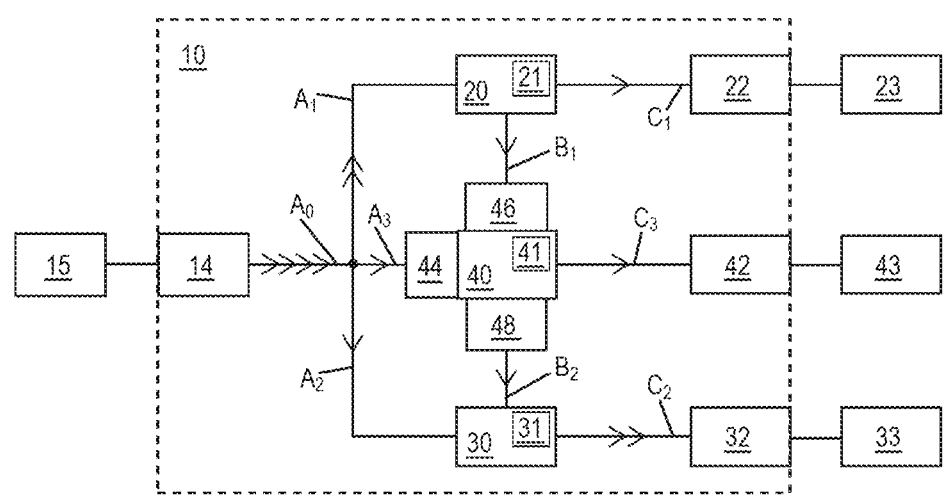
FIG. 5 shows another example of the transmission structure with a further example of a power flow.

FIG. 5 shows in a further example that the transmission structure makes it possible to direct the power by the power electronics system 40 from one summation gearbox to the other summation gearbox in order to cover a power requirement at one of the outputs. In the example shown, one part of the mechanical power is split off in the summation gearbox 20, as received via power path $A_1$, and run via power path $B_1$ to the motor generator 46 and the power electronics system 40. Finally, the power part in the summation gearbox 30 from via power path $A_2$ is added again to the remaining part of the mechanical power via power path $B_2$ and directed via power path $C_2$ to the output 32 for the travel drive. Power from power path $A_3$ provides to the motor generator 44, which may be directed to the output 42 via power path $C_3$. It is possible to switch, in particular, between the provision according to FIG. 4 and to FIG. 5 depending on the power requirements present at the outputs so that an immediate reaction to the loads that are present is made possible.

In a mode of the transmission structure in which power is output to the transmission structure 10 from the outputs, the power is able to be directed to the motor generators by the summation gearbox and recovered. The electric power is able to be stored for later use by an energy store 41. In the case of an additional output of electric power for the mechanical performance of the internal combustion engine, it is also possible to obtain a so-called boost function at the outputs which provides a short-term power boost in order to cover a load peak.

As a result of the proposed transmission structure 10, the number of mechanical components is able to be reduced compared to a conventional transmission structure as a through-transmission of mechanical power does not have to be obtained in full for each output. The components are also able to be realized at the same time, in this case, in a smaller size so that the weight is able to be reduced.

As a result of the reduction in components and in the component sizes, the complexity of the transmission structure decreases at the same time, maintenance being able to be carried out at less expenditure.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method for controlling a power split transmission structure to direct driving power to supply connected consumers, the method comprising:
   directing driving power from a drive through at least three interfaces to at least one output;
   directing driving power from the interfaces through at least two variator paths each comprising a summation gearbox downstream of the interfaces;
   regulating, via a control device, the summation gearbox of each of the variator paths; and
   modifying a torque, a speed, or both, of the drive power via a power electronics system or a hydraulic control device including at least three electric or hydraulic machines arranged in parallel with the summation gearbox of each variator path downstream of the interfaces;
   wherein each of the electric or hydraulic machines is operable in a generator mode to compensate for a power oversupply and a motor mode to compensate for a power shortfall at the at least one outlet of the interfaces;
   wherein there are at least three consumers, the at least one output includes a first output, a second output, and a third output, and the at least three interfaces include a first interface, a second interface, and a third interface, configured to respectively direct the drive power from a node to the first output, the second output, and the third output, each output coupled to at least one of the three consumers;
   wherein a first summation gearbox along the first interface couples to the node via a first power path and the first output via a second power path, and a second summation gearbox along the second interface couples to the node via a third power path and the second output via a fourth power path;
   wherein the power electronics system or a hydraulic control device along the third interface couples to the node via a fifth power path and the third output via a sixth power path;
   wherein the power electronics system or the hydraulic control device selectively modifies a torque, a speed, or both, of the drive power from the first summation gearbox via a seventh power path, from the second summation gearbox via an eighth power path, and from the node via the fifth power path; and
   wherein the at least three electric or hydraulic machines include a first electric or hydraulic machine coupled in between the first summation gearbox and the power electronics system or the hydraulic control device via the seventh power path, a second electric or hydraulic machine coupled in between the second summation gearbox and the power electronics system or the hydraulic control device via the eighth power path, and a third electric or hydraulic machine coupled in between the node and the power electronics system or the hydraulic control device via the fifth power path.

2. The method of claim 1, wherein in a first condition,
   the first summation gearbox receives mechanical power from the node via the first power path and provides mechanical power to the first output via the second power path and to the first electric or hydraulic machine via the seventh power path in which mechanical power from the first summation gearbox is converted to electric power;
   the second electric or hydraulic machine converts electric power from the first electric or hydraulic machine into mechanical power; and
   the second summation gearbox receives mechanical power from the node via the third power path and from the second electric or hydraulic machine via the eighth power path, the second summation gearbox providing mechanical power to the second output via the fourth power path.

3. The method of claim 2, wherein in a second condition,
   the second summation gearbox receives mechanical power from the node via the third power path and provides mechanical power to the second output via the fourth power path and to the second electric or hydraulic machine via the eighth power path in which the mechanical power from the second summation gearbox is converted to electric power;

the first electric or hydraulic machine converts electric power from the second electric or hydraulic machine into mechanical power; and the first summation gearbox receives mechanical power from the node via the first power path and from the first electric or hydraulic machine via the fifth power path, the first summation gearbox providing mechanical power to the first output via the second power path.

4. The method of claim 3, wherein in a third condition,
the third electric or hydraulic machine receives mechanical power from the node via the fifth power path and converts mechanical power from the node into electric power;

the second summation gearbox receives mechanical power from the node via the third power path and provides mechanical power to the second output via the fourth power path and to the second electric or hydraulic machine via the eighth power path in which mechanical power from the second summation gearbox is converted to electric power;

the first electric or hydraulic machine converts electric power from the second electric or hydraulic machine or from the third electric or hydraulic machine into mechanical power; and the first summation gearbox receives mechanical power from the first electric or hydraulic machine via the seventh power path and provides mechanical power to the node via the first power path and to the first output via the second power path.

5. The method of claim 4, wherein in a fourth condition,
the first summation gearbox receives mechanical power from the node via the first power path and provides mechanical power to the first output via the second power path and to the first electric or hydraulic machine via the seventh power path in which mechanical power from the first summation gearbox is converted to electric power;

the second summation gearbox receives mechanical power from the node via the third power path and provides mechanical power to the second output via the fourth power path and to the second electric or hydraulic machine via the eighth power path in which mechanical power from the second summation gearbox is converted to electric power; and the power electronics system or a hydraulics control device provides electric power to the third output via the sixth power path.

6. The method of claim 5, wherein in a fifth condition,
the first summation gearbox receives mechanical power from the node via the first power path and provides mechanical power to the first output via the second power path and to the first electric or hydraulic machine via the seventh power path in which mechanical power from the first summation gearbox is converted to electric power;

the third electric or hydraulic machine converts mechanical power received from the node via the fifth power path into electric power;

the second electric or hydraulic machine converts at least a portion of the electric power from the first electric or hydraulic machine or from the third electric or hydraulic machine into mechanical power; and the second summation gearbox receives mechanical power from the node via the third power path and from the second electric or hydraulic machine via the eighth power path, the second summation gearbox providing mechanical power to the second output via the fourth power path.

7. The method of claim 6, wherein in the fifth condition, electric power from the third electric or hydraulic machine is further provided to the third output via the sixth power path.

8. A method for controlling a power split transmission structure to direct drive power from a drive through at least three interfaces to at least one output to supply connected consumers, the transmission structure having at least two variator paths each comprising a summation gearbox downstream of the interfaces in which drive power is varied via a mechanical and an electrical path, the transmission structure having power electronics or a hydraulic control device including at least three electric or hydraulic machines arranged in parallel with the summation gearbox of each variator path downstream of the interfaces, and the method simultaneously controls the power electronics or a hydraulic control device and the electric or hydraulic machines in such a way that fluctuations in the power supply to the consumers are compensated for by the electric or hydraulic machines by regulating, via a control device, the summation gearbox of each of the variator paths and modifying a torque, a speed, or both, of the drive power via the power electronics system or the hydraulic control device;

wherein there are at least three consumers, the at least one output includes a first output, a second output, and a third output, and the at least three interfaces include a first interface, a second interface, and a third interface, configured to respectively direct the drive power from a node to the first output, the second output, and the third output, each output coupled to at least one of the three consumers;

wherein a first summation gearbox along the first interface couples to the node via a first power path and the first output via a second power path, and a second summation gearbox along the second interface couples to the node via a third power path and the second output via a fourth power path;

wherein the power electronics system or a hydraulic control device along the third interface couples to the node via a fifth power path and the third output via a sixth power path;

wherein the power electronics system or the hydraulic control device selectively modifies a torque, a speed, or both, of the drive power from the first summation gearbox via a seventh power path, from the second summation gearbox via an eighth power path, and from the node via the fifth power path; and wherein the at least three electric or hydraulic machines include a first electric or hydraulic machine coupled in between the first summation gearbox and the power electronics system or the hydraulic control device via the seventh power path, a second electric or hydraulic machine coupled in between the second summation gearbox and the power electronics system or the hydraulic control device via the eighth power path, and a third electric or hydraulic machine coupled in between the node and the power electronics system or the hydraulic control device via the fifth power path; and wherein each of the electric or hydraulic machines is operable in a generator mode to compensate for a power oversupply and a motor mode to compensate for a power shortfall or a power oversupply at the at least one outlet of the interfaces.

9. The method of claim 8, wherein each variator path is individually driven to direct the drive power from one output to another output so that the drive power for each output can be shared.

10. The method according to claim 8, wherein the transmission structure receives the drive power through the at least one output or directs the drive power to a further output or converts the drive power into electric or hydraulic power.

11. The method of claim 8, wherein in a first condition,
the first summation gearbox receives mechanical power from the node via the first power path and provides mechanical power to the first output via the second power path and to the first electric or hydraulic machine via the seventh power path in which mechanical power from the first summation gearbox is converted to electric power;
the second electric or hydraulic machine converts electric power from the first electric or hydraulic machine into mechanical power; and
the second summation gearbox receives mechanical power from the node via the third power path and from the second electric or hydraulic machine via the eighth power path, the second summation gearbox providing mechanical power to the second output via the fourth power path.

12. The method of claim 11, wherein in a second condition,
the second summation gearbox receives mechanical power from the node via the third power path and provides mechanical power to the second output via the fourth power path and to the second electric or hydraulic machine via the eighth power path in which the mechanical power from the second summation gearbox is converted to electric power;
the first electric or hydraulic machine converts electric power from the second electric or hydraulic machine into mechanical power; and
the first summation gearbox receives mechanical power from the node via the first power path and from the first electric or hydraulic machine via the fifth power path, the first summation gearbox providing mechanical power to the first output via the second power path.

13. The method of claim 12, wherein in a third condition,
the third electric or hydraulic machine receives mechanical power from the node via the fifth power path and converts mechanical power from the node into electric power;
the second summation gearbox receives mechanical power from the node via the third power path and provides mechanical power to the second output via the fourth power path and to the second electric or hydraulic machine via the eighth power path in which mechanical power from the second summation gearbox is converted to electric power;
the first electric or hydraulic machine converts electric power from the second electric or hydraulic machine or from the third electric or hydraulic machine into mechanical power; and
the first summation gearbox receives mechanical power from the first electric or hydraulic machine via the seventh power path and provides mechanical power to the node via the first power path and to the first output via the second power path.

14. The method of claim 13, wherein in a fourth condition,
the first summation gearbox receives mechanical power from the node via the first power path and provides mechanical power to the first output via the second power path and to the first electric or hydraulic machine via the seventh power path in which mechanical power from the first summation gearbox is converted to electric power;
the second summation gearbox receives mechanical power from the node via the third power path and provides mechanical power to the second output via the fourth power path and to the second electric or hydraulic machine via the eighth power path in which mechanical power from the second summation gearbox is converted to electric power; and
the power electronics system or a hydraulics control device provides electric power to the third output via the sixth power path.

15. The method of claim 14, wherein in a fifth condition,
the first summation gearbox receives mechanical power from the node via the first power path and provides mechanical power to the first output via the second power path and to the first electric or hydraulic machine via the seventh power path in which mechanical power from the first summation gearbox is converted to electric power;
the third electric or hydraulic machine converts mechanical power received from the node via the fifth power path into electric power;
the second electric or hydraulic machine converts at least a portion of the electric power from the first electric or hydraulic machine or from the third electric or hydraulic machine into mechanical power; and
the second summation gearbox receives mechanical power from the node via the third power path and from the second electric or hydraulic machine via the eighth power path, the second summation gearbox providing mechanical power to the second output via the fourth power path.

16. The method of claim 15, wherein in the fifth condition,
electric power from the third electric or hydraulic machine is further provided to the third output via the sixth power path.

* * * * *